United States Patent [19]
Winters, deceased

[11] 4,171,961
[45] Oct. 23, 1979

[54] ARRANGEMENT FOR INTERCEPTING ENTRAINED CONTAMINANTS FROM A GASEOUS MEDIUM IN A SCRUBBING LIQUID

[75] Inventor: Heinrich Winters, deceased, late of Düsseldorf, Fed. Rep. of Germany, by Egon Offergeld, Karl-Wilhelm Belting, authorized representatives

[73] Assignee: Babcock-BSH Aktiengesellschaft Büttner-Schilde-Haas AG, Krefeld, Fed. Rep. of Germany

[21] Appl. No.: 828,628

[22] Filed: Aug. 29, 1977

[30] Foreign Application Priority Data

Aug. 27, 1976 [DE] Fed. Rep. of Germany ....... 2638644

[51] Int. Cl.² ............................................. B01D 47/16
[52] U.S. Cl. ..................... 55/257 C; 55/237; 261/79 A
[58] Field of Search ............... 261/79 A, 89, 90; 55/235–238, 257 C, 257 R

[56] References Cited

U.S. PATENT DOCUMENTS

| | | | |
|---|---|---|---|
| 2,310,411 | 2/1943 | Fisher | 55/238 X |
| 3,093,468 | 6/1963 | Krochta | 55/238 |
| 3,175,340 | 3/1965 | Schulze | 261/79 A X |
| 3,191,364 | 6/1965 | Sylvan | 55/257 C |
| 3,292,347 | 12/1966 | Hodgkinson | 55/257 C |
| 3,304,695 | 2/1967 | Krochta | 55/238 |
| 3,566,582 | 3/1971 | Yankura | 55/238 X |
| 3,789,585 | 2/1974 | Arnold et al. | 261/79 A X |
| 3,802,162 | 4/1974 | Deane | 55/238 X |
| 4,067,703 | 1/1978 | Dullien et al. | 55/238 X |

FOREIGN PATENT DOCUMENTS

563408  1/1958 Belgium ..................................... 55/238

*Primary Examiner*—Richard L. Chiesa
*Attorney, Agent, or Firm*—Michael J. Striker

[57] ABSTRACT

An arrangement for intercepting entrained contaminants from a gaseous medium in a scrubbing liquid has a whirling chamber, a droplet-separating passage, and an impeller arranged coaxially downstream of one another. The whirling chamber has a constant-width inner annular zone and an outer annular zone surrounding the inner annular zone and decreasing in its axial width in the radially outward direction. A housing surrounds the impeller and/or the passage and is either cylindrical or spiral-shaped or partly both, and in the latter event the differently shaped parts of the housing are separated by a partition which has a central orifice of a smaller diameter than that of the impeller. The contaminated gaseous medium is admitted into the whirling chamber tangentially thereof and droplets of scrubbing liquid are introduced into the whirling chamber through a plurality of apertures arranged in an annular fashion for the scrubbing liquid to become admixed with the gaseous medium and to thus intercept the contaminants therefrom. A stripping slot is formed at the downstream end of the passage between the casing bounding the same and an inlet nozzle of the impeller.

21 Claims, 4 Drawing Figures

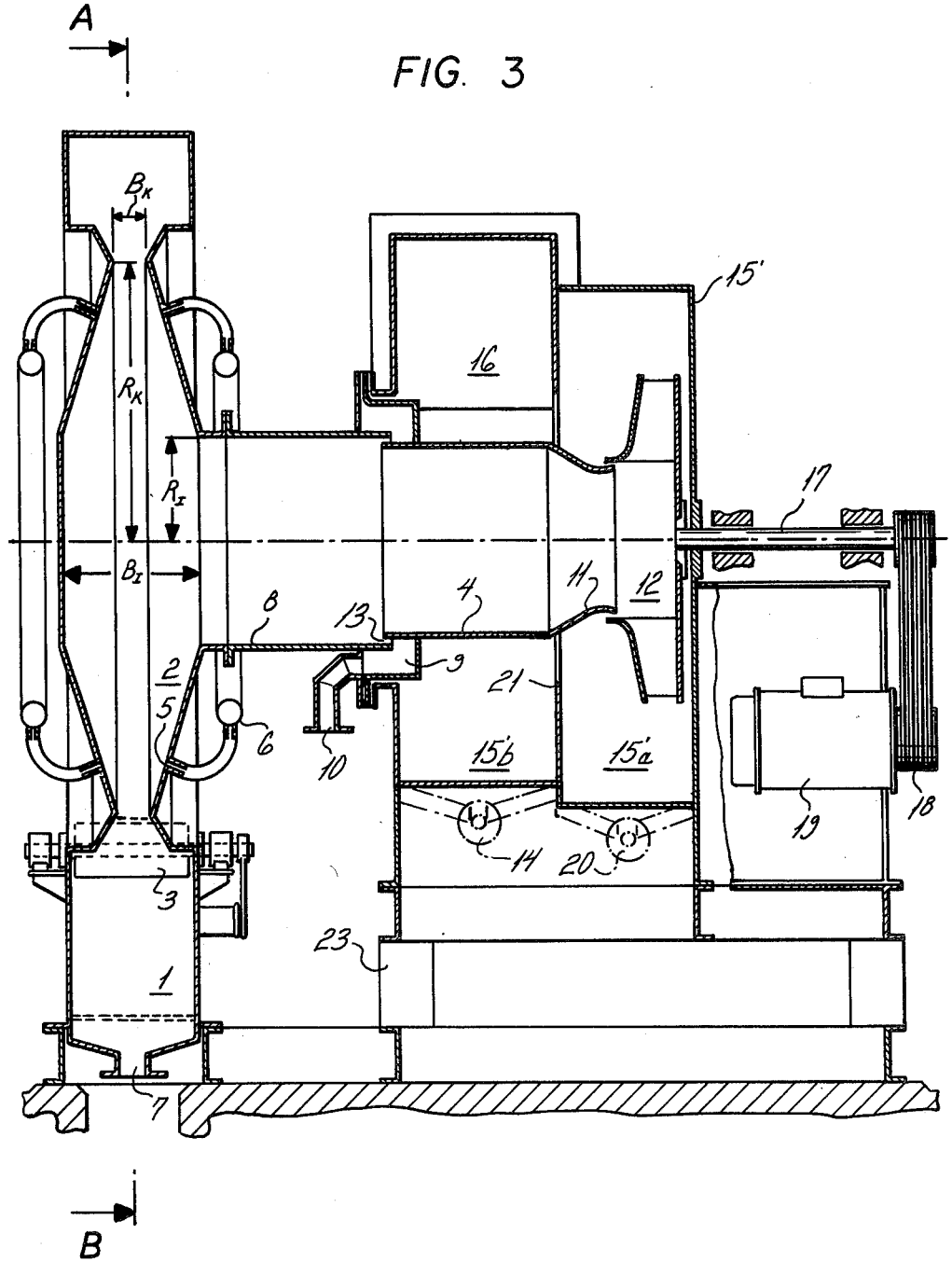

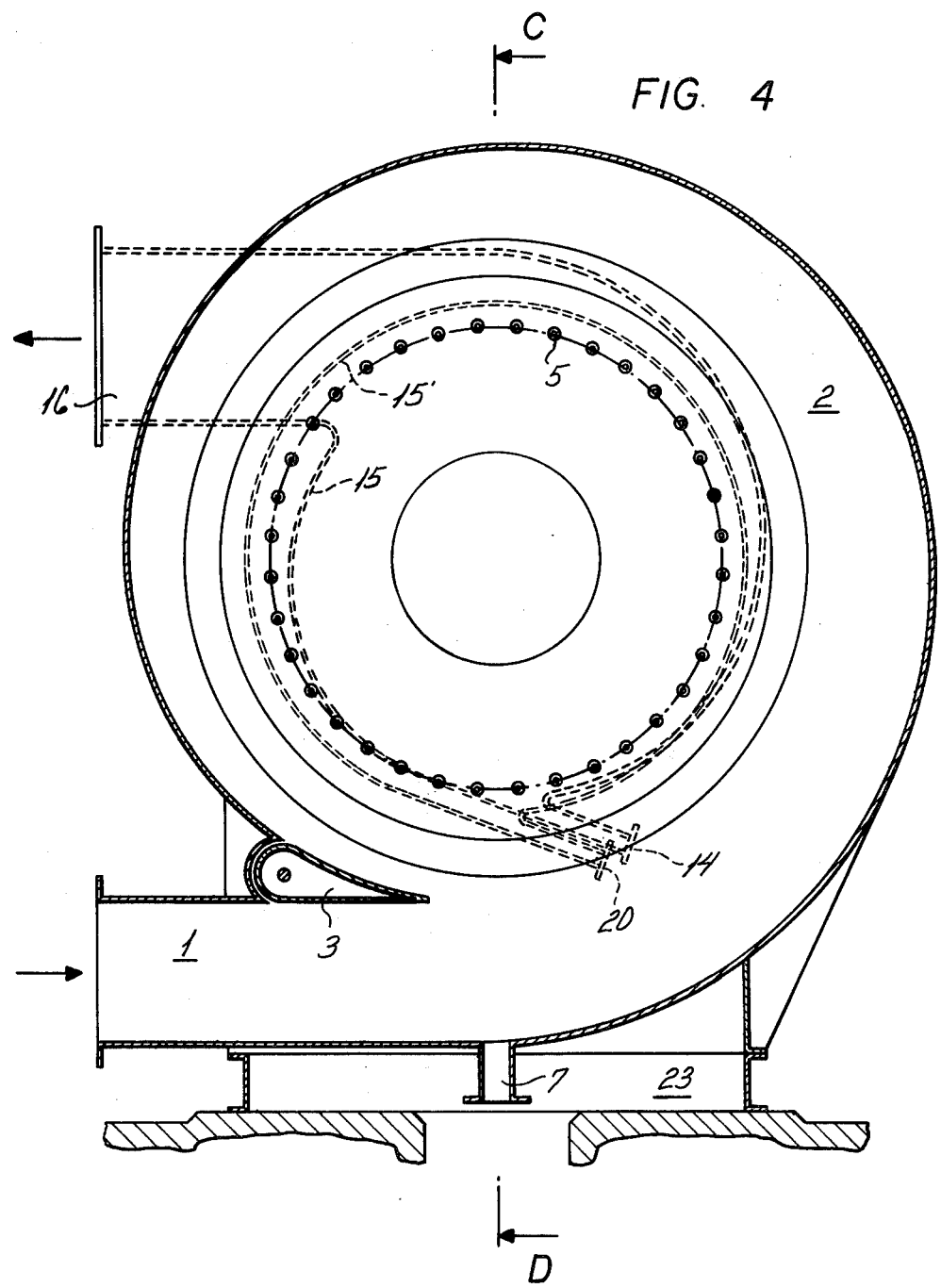

ARRANGEMENT FOR INTERCEPTING ENTRAINED CONTAMINANTS FROM A GASEOUS MEDIUM IN A SCRUBBING LIQUID

BACKGROUND OF THE INVENTION

The present invention relates to an arrangement for intercepting entrained contaminants from a gaseous medium in a scrubbing liquid.

There are already known various arrangements of the type here under consideration, among them such which incorporate a whirling chamber at the circumference of which there are provided introducing apertures for admitting the scrubbing liquid into the interior of the whirling chamber, the whirling chamber having one or more tangential inlets for the admission of the contaminated gaseous medium into the whirling chamber, and an axial outlet opening therefrom.

There has been already proposed, in an arrangement of this type, to provide the whirling chamber in a shared cylindrical housing with an impeller which is arranged coaxially adjacent the whirling chamber and upstream thereof, and to equip the arrangement with a cylindrical chamber which serves to separate the droplets from the gaseous medium.

The purifying effect, that is, the degree of removal of the particulate, liquid or gaseous contaminants from the gaseous medium, increases with the increasing dwell time of the droplets of the scrubbing liquid in the whirling chamber. An increase in the effectiveness of the arrangement has heretofore been accomplished by changing the axial dimensions of the whirling chamber, particularly by means of a conical narrowing or broadening of the whirling chamber by correspondingly shaping the axial walls bounding the whirling chamber. The width of the whirling chamber which, under any particular circumstances, was considered optimum, has been heretofore obtained by experimentation, which resulted in substantial expenditures in terms of man hours and investment.

In the above-discussed proposed arrangement, the whirling motion of the gaseous medium which exists at the exit of the whirling chamber, is so diverted into a droplet separator that it can be used therein as a helical twisting motion for the separation of the entrained small droplets from the gaseous medium.

It is well known that hot and chemically aggressive gases which are to be cooled and/or decontaminated, require special protective measures to shield the various components of the arrangement from the detrimental influences of such gases. In the above-discussed proposed arrangement, there are arranged in the critical region in the immediate vicinity of which the rapidly rotating impeller is arranged, nipples, guiding baffles, accumulating pockets or grooves for the removal of the separated scrubbing liquid, and similar components so that it is very difficult if not impossible to provide an otherwise known ceramic lining at this critical region.

SUMMARY OF THE INVENTION

Accordingly, it is a general object of the present invention to avoid the disadvantages of the prior art.

More particularly, it is an object of the present invention to so construct a scrubbing arrangement as not to be possessed of the disadvantages of the prior-art arrangements of this type.

A further object of the present invention is to so construct the arrangement of the type here under consideration as to reduce the power requirements for driving the impeller.

A yet another object of the present invention is to so select the dimensions of the whirling chamber as to optimize the dwell time of the droplets of the scrubbing liquid therein without incurring undue expenses.

A concomitant object of the present invention is to provide a scrubbing arrangement which is simple in construction, inexpensive to manufacture and operate, and reliable in operation.

A still further object of the present invention is to so design the scrubbing arrangement as to be able to provide a durable lining at the critical region of the arrangement with a relative ease.

In pursuance of these objects and others which will become apparent hereafter, one feature of the present invention resides, briefly stated, in an arrangement for intercepting entrained contaminants from a gaseous medium in a scrubbing liquid, which comprises a vessel defining a whirling chamber having an axis and an outlet opening about the same; means for so admitting the contaminated gaseous medium into said chamber as to impart to the contents of said chamber an angular momentum about said axis and thus whirl the same; means for introducing the scrubbing liquid into said chamber to become admixed with the whirling contents thereof in form of droplets; a droplet-separating casing bounding a substantially cylindrical passage coaxially adjacent said chamber and having an upstream end communicating with the latter through said outlet opening, and a downstream end; and an impeller coaxially mounted at and communicating with said downstream end of said passage. Advantageously, the impeller has impeller blades which are so shaped as to assure smooth entry of the whirling gaseous medium from said passage between said blades.

In a currently preferred embodiment of the present invention, the chamber has a first annular zone about said axis and having an axial width $B_J$ and a radius $R_J$, and a second annular zone surrounding said first annular zone and having a maximum radius $R_K$ and a width which decreases from $B_J$ at the radius $R_J$ to $B_K$ at the radius $R_K$. Advantageously, said widths of said annular zones are within the following proportions:

$$1.75 < B_J/B_K < 7$$

and said radii of said annular zones are within the following proportions:

$$0.35 < R_J/R_K < 0.65.$$

Preferably, the impeller is surrounded by a housing which defines a space about the above-mentioned axis which may be either substantially cylindrical, substantially of a spiral cross-section, or partly each of the above. It is particularly advantageous when the substantially cylindrical part of the housing accommodates the impeller and the region of the spiral cross section is axially offset from the impeller. The latter region advantageously surrounds a guiding sleeve which coaxially extends between the downstream end of said passage and the impeller and which communicates the former with the latter. The housing composed of the two above-mentioned regions preferably includes a partition between the two regions and having an orifice which communicates the regions with one another. The orifice may coaxially surround the above-mentioned axis and have a diameter which is smaller than the diameter of the impeller.

The contaminated gaseous medium is admitted into the whirling chamber through at least one admitting port, and a baffle is arranged at the admitting port and is infinitely adjustable in its position. The baffle may be mounted within the vessel at the admitting port for pivoting about a pivot axis, the baffle converging from the pivot axis in the direction of flow of the gaseous medium in a flow-enhancing manner. Advantageously, the baffle extends over the width of the whirling chamber.

For the removal of the separated scrubbing liquid, each of the said vessel, casing and housing has at least one outlet port for the scrubbing liquid separated therein from the gaseous medium. When the housing is composed of the two above-mentioned regions, one outlet port is associated with each of such regions. A depression, such as an accumulating groove or an annular recess may be provided for, and communicate with, each respective one of the above-discussed outlet ports.

According to a further advantageous concept of the present invention, the means for introducing the scrubbing liquid into the whirling chamber includes a plurality of apertures which are arranged at least at one of the axial sides of the vessel, and distributed in at least one annulus about said axis. Then, the introducing means may further include a substantially annular conduit for distributing the scrubbing liquid among the apertures of the annulus. To advantage, the apertures of the plurality are also arranged at the other axial side of the vessel. In a currently preferred advantageous embodiment of the present invention, the aforementioned apertures are arranged intermediate the second annular zone of the whirling chamber and an axial projection of the casing onto the vessel.

A conical nozzle with a rounded inlet portion may be advantageously arranged immediately upstream of the impeller and communicate therewith. The nozzle may be arranged at a radial distance from the casing to bound a stripping slot therewith. However, when the above-mentioned guiding sleeve is provided, the nozzle may be arranged at a radial distance from the guiding sleeve to bound a stripping slot therewith.

In the whirling chamber, the contaminated gaseous medium which, in the most instances, originally has an elevated temperature, is cooled almost to the dew point. As a result of this, there is obtained a substantial reduction in the volume assumed by the gaseous medium which is approximately proportionate to the absolute temperature of the gaseous medium. This proportionality is also valid for the power requirement of the impeller in the same sense so that a very substantial reduction in the power input into the impeller is obtained as a result of the cooling of the gaseous medium upstream of the impeller. A further reduction in the power requirement demanded from the drive of the impeller results from the fact that the whirling motion conducted by the gaseous medium when the same leaves the whirling chamber and the cylindrical passage or the cylindrical guide sleeve, can be utilized as an auxiliary enhancing twist at the entry of the impeller. As a result of the above-discussed particular construction of the various components of the arrangement, it is possible, without encountering any great difficulties, to provide a ceramic lining at the desired surfaces or cross sections.

As a result of the dimensions of the whirling chamber proposed by the present invention, the radial component of the speed of motion of the whirling contents of the whirling chamber is so oriented and has such a magnitude that the droplets of the scrubbing liquid, from a certain magnitude upwardly, conduct substantially circular movements for an extended period of time, relatively speaking. The circumferential speed of the droplets is, upon the termination of the tangential acceleration, approximately equal to the tangential speed of movement of the gaseous medium. The relative speed between the droplets and the gaseous medium is approximately equal in magnitude to the radial component of the speed of movement of the gaseous medium, when the droplets move in approximately circular paths. As a result of this relative speed, flow-resistance forces also act on the droplets of a certain magnitude, such resistance forces being in equilibrium with the centrifugal forces acting thereon at a corresponding circumferential speed of motion of the droplets on the respective circular path.

The proposed dimensions of the whirling chamber at its outer and inner circumference have the consequence that the optimum dimensions can be constructionally determined in a relatively easy manner and without additional expenses in such a manner that the relative speed of the droplets of the scrubbing liquid is virtually constant and the dwell time of the droplets in the gaseous medium to be treated is substantially increased with respect to what has been known before, as a result of which the removal of the particulate, liquid and/or gaseous contaminants from the gaseous medium is improved.

The arrangement of the present invention preferably has the axis of the whirling chamber and thus of the entire arrangement extend horizontally; however, the same concept can also be used in an arrangement, the axis of which extends vertically or even in any other direction.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 3 is a view similar to FIG. 1 but of a modification of the scrubbing arrangement of the present invention taken on line C-D of FIG. 4; and FIG. 4 is a view similar to FIG. 2 but of the modification of FIG. 3, taken on line A-B thereof.

DETAILED DISCUSSION OF THE PREFERRED EMBODIMENTS

Figure 1:
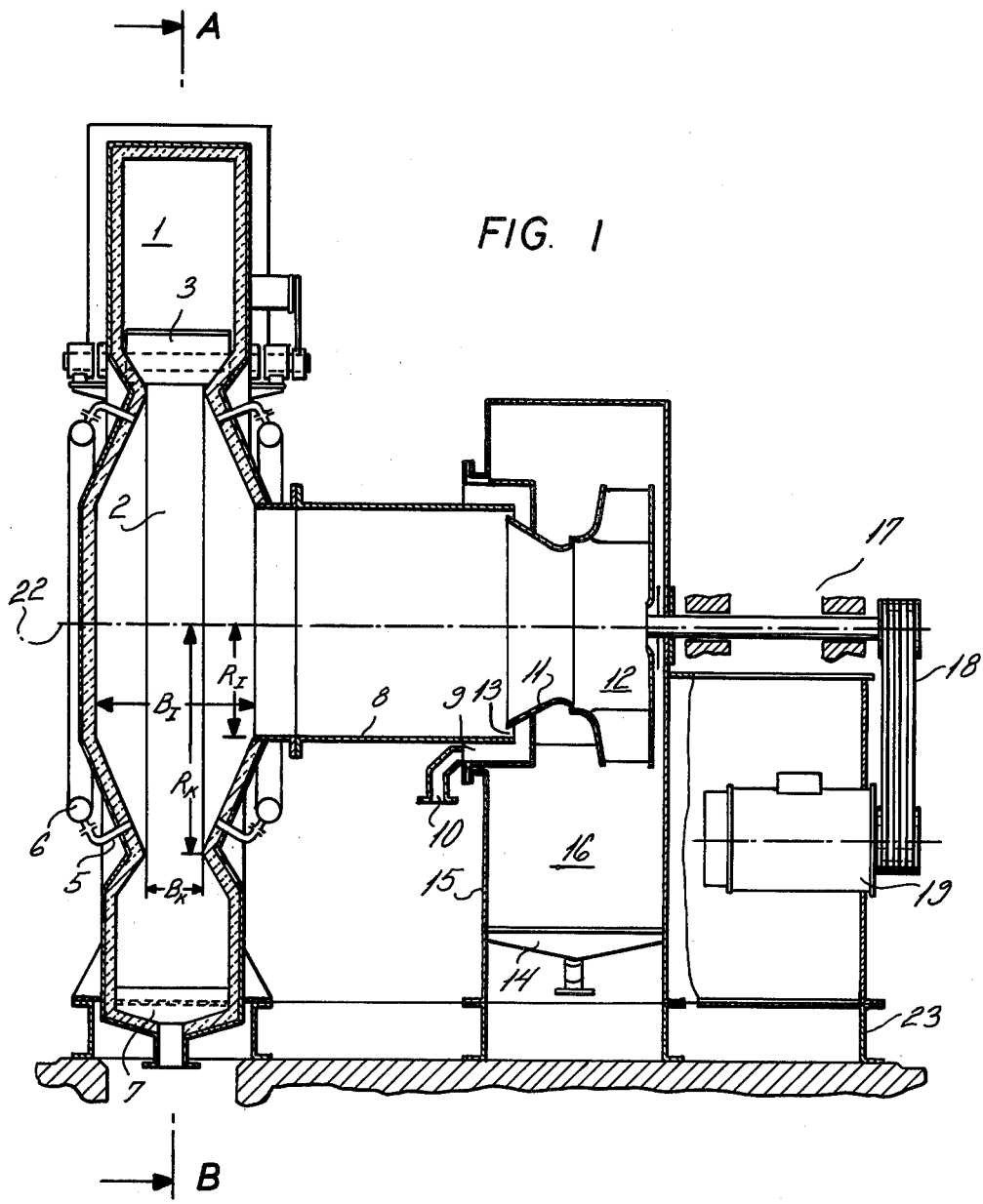
FIG. 1 is a somewhat diagrammatic partly sectioned side elevational view of the scrubbing arrangement of the present invention taken on line C-D of FIG. 2.

Referring now to the drawing in detail it is to be mentioned that the two modifications of the basic concept of the present invention illustrated therein are very similar to one another so that the same reference numerals have been used to designate the corresponding parts thereof. As may be ascertained from the drawings, the arrangement of the present invention is to be used as a scrubber for removing contaminants, particularly noxious gases and particles, from an advancing stream of a gaseous medium.

The contaminated gas is admitted into a whirling chamber 2 through an inlet nipple 1 which extends tangentially to the whirling chamber 2. A ceramic lining 22 is provided at the internal surface of the whirling chamber 2. As a result of the tangential entry of the gaseous medium into the whirling chamber 2, and an axial exit of the gaseous medium from the whirling chamber 2, a whirling motion is imparted to the gaseous medium present in the whirling chamber 2 and a vortex forms therein.

The scrubbing liquid is injected into the interior of the whirling chamber 2 through nozzles 5 which are arranged at both axial sides of the whirling chamber 2, being distributed at each respective axial side in a respective annulus. A scrubbing liquid is supplied to the nozzles 5 by annular conduits 6. As particularly seen in FIGS. 1 and 3, the nozzles 5 are arranged between a conical narrowing zone of the whirling zone and the outer circumference of a cylindrical casing 8 or its projection onto the whirling chamber vessel 2.

The cylindrical casing 8 which is smaller in diameter than the whirling chamber 2 and which is coaxial with the latter axially adjoins the whirling chamber 2, and an impeller 12 accommodated in a housing 15 or 15' is located axially adjacent to the cylindrical casing 8 and communicates with the passage bounded thereby. It is of a particular importance in this context that the entry angle of the blades of the impeller 12 is so selected as to take into account the twisting motion of the gaseous medium advancing through the passage of the cylindrical casing 8 to assure smooth entry of the gaseous medium into the channels between the blades.

Figure 2:
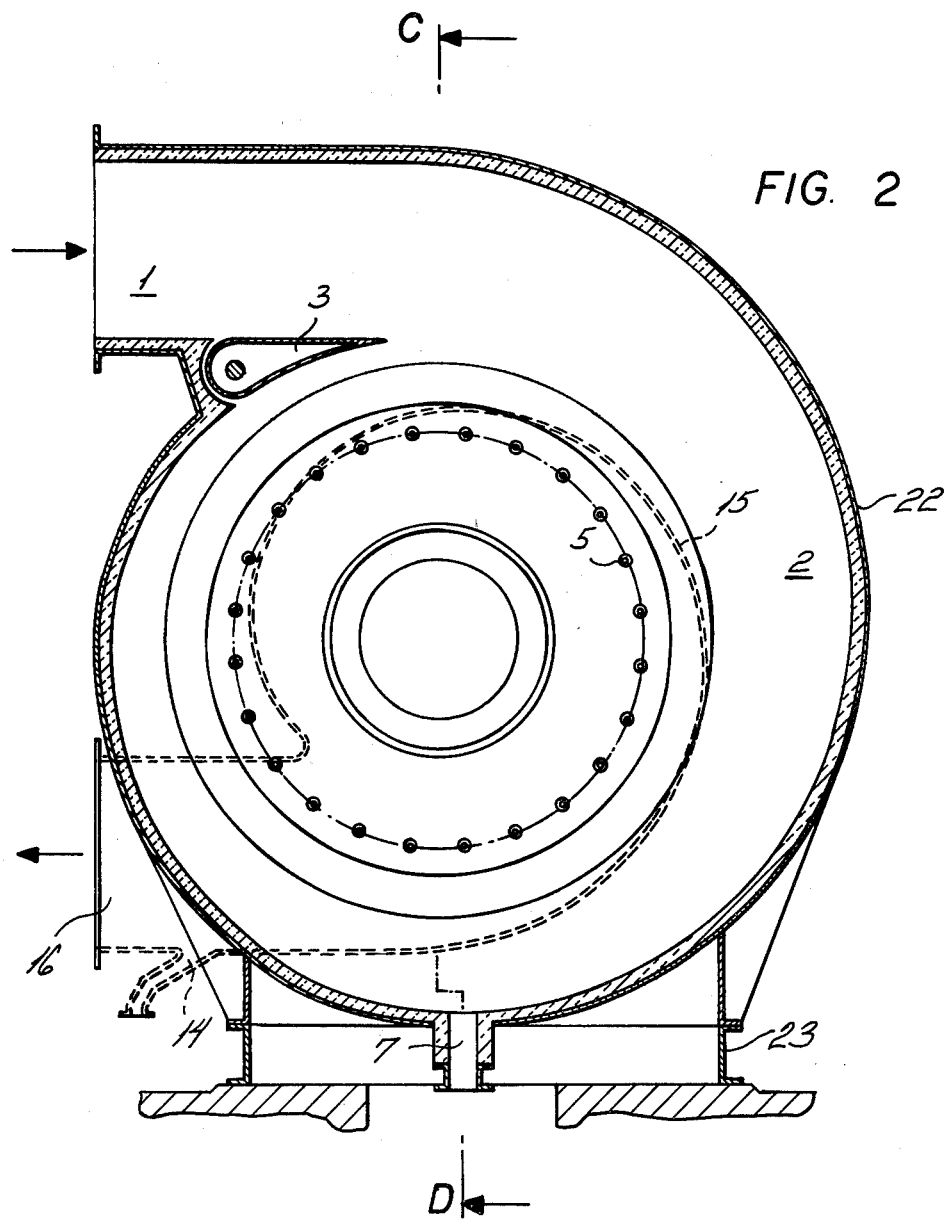
FIG. 2 is a cross-sectional view taken on line A-B of FIG. 1.

As seen in FIGS. 1 and 2, the impeller housing 15 has a spiral cross-section and, as seen in FIGS. 3 and 4, the impeller housing 15' is cylindrical in the region of the impeller 12 and has a spiral cross section in the region surrounding a cylindrical guiding sleeve 4 which is arranged between the cylindrical casing 8 and the impeller 12. A partition 21 having a central opening is arranged between the cylindrical part 15'a and the spiral-shaped part 15'b of the impeller housing 15'. The diameter of the orifice in the partition 21 is smaller than the outer diameter of the impeller 12.

In the vicinity of the contact point of the tangent of the gas-inlet nipple 1 with the circumference of the whirling chamber vessel 2, there is arranged an infinitely adjustable baffle 3 which converges in the direction of flow of the gaseous medium in a manner which enhances the streamlined flow of the gaseous medium into and within the whirling chamber 2. Advantageously, the baffle 3 extends over the entire width of the whirling chamber 2.

The whirling chamber 2, the spiral-shaped part 15'b of the impeller housing 15', and the cylindrical part 15'a of the impeller housing 15' are each provided with an accumulating depression each communicating with an outlet port 7, 14 and 20, respectively. An annular channel 9 is associated with an outlet port 10 of the cylindrical casing 8.

In order to obtain advantageous flow conditions within the whirling chamber 2, the axial limiting walls of the whirling chamber 2 extend, in a conical fashion, from a narrow region thereof to the casing 8, in a diverging manner. By resorting to the use of a non-illustrated device, the width of the whirling chamber 2 can be varied by axial displacement of one or the other or both of the axial limiting walls of the whirling chamber 2. The largest width $B_I$ of the whirling chamber 2 diminishes in accordance with the distance from the axis of the chamber 2 until it amounts to the smallest width $B_K$ at the radius $R_K$. Herein, the following proportions are valid:

$$1.75 < B_I/B_K < 7$$

and $$0.35 < R_I/R_K < 0.65.$$

In these relations, $R_I$ is the radius for the greatest width $B_I$ and $R_K$ is the radius for the smallest width $B_K$. This configuration of the scrubbing zones can also be utilized in arrangements which do not possess an integrated impeller.

Upstream of the inlet of the impeller 12, there is arranged a conical nozzle 11 with a rounded inner portion. This conical nozzle 11 serves, on the one hand, as a flow-guiding nozzle for the impeller 12 and, on the other hand, for defining a stripping slot 13. To serve the latter purpose, the nozzle 11 is arranged at a distance from the cylindrical casing 8, as seen in FIG. 1, or it is arranged at a distance from the cylindrical guide sleeve 4, as illustrated in FIG. 3, so that a slot comes into existence between the outer surface of the nozzle 11 and the cylindrical casing 8 or the cylindrical guide sleeve 4, the width of the slot corresponding to the width of the stripping gap 13.

The purified gaseous medium leaves the spiral-shaped housing 15 through a tangentially extending discharge nipple 16. The arrangement further includes a shaft for the impeller 12, bearings 17, a belt drive 18 and a motor 19, all of which are conventional components which need no special description. The entire arrangement rests and is supported on a base frame 23.

The tangential component of the speed of the whirling motion can be influenced by the adjustable baffle 3. After flowing through the whirling chamber 2, the gaseous medium enters the cylindrical casing 8 or, more particularly, the cylindrical passage bounded thereby, and flows through the same in the form of a helical twisting stream. The casing 8 serves as a separator of the droplets of the scrubbing liquid from the advancing stream of the gaseous medium. The separated scrubbing liquid is guided to flow through the stripping slot 13 and the annular channel 9 to the outlet nipple 10. The gaseous medium exiting from the impeller 12 enters the spiral-shaped impeller housing 15, as may be ascertained from FIG. 1. A small proportion of the scrubbing liquid is still present in the gaseous medium when the same enters the impeller 12 in the form of fine droplets. Due to the action of the acceleration forces existing in the impeller 12, these tiny droplets deposit on the blades of the impeller 12 and form a liquid film on the front surfaces of the blades of the impeller 12. This film then detaches itself from the radially outward ends of the impeller blades of the impeller 12. In the arrangement according to the present invention, the relatively large detached drops of the scrubbing liquid are radially thrown against the impeller housing 15, and then the scrubbing liquid is conducted through an accumulating depression or groove toward and into the outlet nipple 14.

A significantly better separation of the droplets in this region is achieved when, as illustrated in FIG. 3, the impeller housing 15' is cylindrical in the region of the impeller 12, and is spiral-shaped in the region around the cylindrical guiding sleeve 4. Under these circumstances, the drops which detach themselves from the blades of the impeller 12, are hurled against the cylindrical part 15'a of the impeller housing 15'. The purified gaseous medium leaves the housing part 15'a through the orifice in the partition 21 and enters the spiral-shaped part 15'b of the housing 15'. The partition 21 prevents the liquid film which develops in the cylindrical part 15'a from penetrating into the spiral-shaped part 15'b of the housing 15'. Simultaneously therewith, it produces the effect of a vortex sink in which the droplets which still remain in the stream of the gaseous medium and which move freely relatively thereto are propelled outwardly against the cylindrical part 15'a of the housing 15' by centrifugal forces acting thereon.

As a result of the different construction and configuration of the arrangement of the present invention from those of the prior art, and particularly of the housing 15 or 15', the separation of the scrubbing liquid droplets from the gaseous medium is rendered significantly more effective than heretofore known. This particular configuration of the housing 15 or 15' can also be used for different scrubbing arrangements, such as those working on the venturi principle or the like.

It will be understood that each of the elements described above, or two or more together, may also find a useful application in other types of constructions differing from the types described above.

While the invention has been illustrated and described as embodied in an arrangement for scrubbing contaminants from a gas, it is not intended to be limited to the details shown, since various modifications and structural changes may be made without departing in any way from the spirit of the present invention.

Without further analysis, the foregoing will so full reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for intercepting entrained contaminants from a gaseous medium in a scrubbing liquid, comprising a vessel defining a whirling chamber having an axis and an outlet passage about the same, said whirling chamber having a first annular zone about said axis and having an axial width $B_I$ and a radius $R_I$, and a second annular zone surrounding said first annular zone and having a maximum radius $R_K$ and a width which decreases from $B_I$ at the radius $R_I$ to $B_K$ at the radius $R_K$; means for tangentially admitting the contaminated gaseous medium into said chamber to impart to the contents of said chamber an angular momentum about said axis and tus whirl the same; means for introducing the scrubbing liquid into said chamber to become admixed with the whirling gaseous medium therein in forms of droplets, said introducing means including a plurality of inlet ports arranged about said axis of said whirling chamber in at least one wall of the latter so that the scrubbing liquid moves along substantially circular paths and becomes admixed with the whirling gaseous medium in both said zones of said whirling chamber, and said circular paths are stable as a result of provision in said whirling chamber of said first annular zone and said second annular zone of a decreasing width, said widths of said annular zones of said whirling chamber being within the following proportions:

$$1.75 < B_I/B_K < 7$$

and said radii of said annular zones being within the following proportions:

$$0.35 < R_I/R_K < 0.65$$

whereby the paths are maintained stable in a wide range of path radii and thereby in a wide range of variations in the weight rate of flow of the gaseous medium; droplet-separating means including a substantially cylindrical casing coaxially adjacent said outlet passage of said chamber and having an upstream opening communicating with the latter; and an impeller coaxially mounted in said casing and communicating with said outlet passage.

2. An arrangement as defined in claim 1, wherein said impeller has impeller blades which are so shaped as to assure smooth entry of the whirling gaseous medium from said passage between said blades.

3. An arrangement as defined in claim 1, wherein said casing defines a space about said axis which has at least a region of a spiral cross section.

4. An arrangement as defined in claim 3, wherein each of said vessel, casing and passage has at least one outlet port for the scrubbing liquid separated therein from the gaseous medium.

5. An arrangement as defined in claim 4; and further comprising a depression communicating with the respective outlet port and operative for accumulating the separated liquid.

6. An arrangement as defined in claim 3, wherein said space has another region of a substantially cylindrical cross section.

7. An arrangement as defined in claim 6; and wherein said housing includes a partition between said region and said other region and having an orifice communicating said regions.

8. An arrangement as defined in claim 7, wherein said orifice surrounds said axis and has a diameter smaller than that of said impeller.

9. An arrangement as defined in claim 6, wherein said another region accommodates said impeller; and wherein said region is axially offset from said impeller.

10. An arrangement as defined in claim 9, further comprising a guiding sleeve coaxially extending between said passage and said impeller and communicating the former with the latter; and wherein said region surrounds said guiding sleeve.

11. An arrangement as defined in claim 10; and wherein said guiding sleeve is in the form of a nozzle with a conical inlet portion and on that portion arranged immediately upstream of said impeller and communicating therewith.

12. An arrangement as defined in claim 11, wherein the inlet portion of said nozzle is arranged at a radial distance from said passage to bound a stripping slot therewith.

13. An arrangement as defined in claim 11, wherein said guiding sleeve further includes a cylindrical extension of said inlet portion of said nozzle, the upstream end of said extension being arranged at a radial distance from said passage to define said stripping gap therewith.

14. An arrangement as defined in claim 1, wherein said admitting means includes at least one admitting port; and further comprising a baffle at said admitting port and infinitely adjustable in its position.

15. An arrangement as defined in claim 14; further comprising means for mounting said baffle within said vessel at said admitting port for pivoting about a pivot axis and wherein said baffle converges from said pivot axis in the direction of flow of the gaseous medium in a flow-enhancing manner.

16. An arrangement as defined in claim 14, wherein said baffle extends over the width of said whirling chamber.

17. An arrangement as defined in claim 1, wherein said plurality of inlet ports is arranged at least at one of the axial sides of said vessel.

18. An arrangement as defined in claim 17, wherein said inlet ports of said plurality are also arranged at the other axial side of said vessel.

19. An arrangement as defined in claim 17, wherein said inlet ports of said plurality are arranged intermediate said second annular zone of said chamber and an axial projection of said casing onto said vessel.

20. An arrangement as defined in claim 1, wherein said inlet ports are distributed in at least one annulus about said axis.

21. An arrangement as defined in claim 20, wherein said introducing means further includes a substantially annular conduit for distributing the scrubbing liquid among said inlet ports of said annulus.

* * * * *